US008838582B2

(12) United States Patent
Hörnkvist et al.

(10) Patent No.: US 8,838,582 B2
(45) Date of Patent: Sep. 16, 2014

(54) FACETED SEARCH RESULTS

(75) Inventors: John M. Hörnkvist, Cupertino, CA (US); Wayne R. Loofbourrow, San Jose, CA (US); Eric R. Koebler, Aptos, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/023,449

(22) Filed: Feb. 8, 2011

(65) Prior Publication Data
US 2012/0203766 A1   Aug. 9, 2012

(51) Int. Cl.
*G06F 17/30* (2006.01)
*G06F 7/00* (2006.01)

(52) U.S. Cl.
CPC .............................. *G06F 17/30112* (2013.01)
USPC ................ 707/722; 707/731; 706/14; 706/20

(58) Field of Classification Search
CPC .................... G06F 17/30864; G06F 17/30616; G06F 17/30545; G06F 17/30557; G06F 17/30696; G06F 17/30578; G06F 17/30873
See application file for complete search history.

(56) References Cited

U.S. PATENT DOCUMENTS

| | | | |
|---|---|---|---|
| 6,385,602 B1 | 5/2002 | Tso et al. | |
| 6,493,721 B1* | 12/2002 | Getchius et al. | ........................ 1/1 |
| 6,496,843 B1* | 12/2002 | Getchius et al. | .............. 715/210 |
| 6,757,673 B2 | 6/2004 | Makus et al. | |
| 7,437,358 B2 | 10/2008 | Arrouye et al. | |
| 7,707,500 B2* | 4/2010 | Martinez | ........................ 715/717 |
| 7,730,012 B2 | 6/2010 | Arrouye et al. | |
| 2003/0158866 A1* | 8/2003 | Goodwin et al. | .............. 707/200 |
| 2003/0163485 A1* | 8/2003 | Goodwin et al. | ........... 707/104.1 |
| 2005/0160107 A1* | 7/2005 | Liang | .............................. 707/100 |
| 2005/0289109 A1* | 12/2005 | Arrouye et al. | ..................... 707/1 |
| 2007/0226204 A1* | 9/2007 | Feldman | ............................ 707/5 |
| 2007/0226640 A1 | 9/2007 | Holbrook et al. | |
| 2007/0244900 A1 | 10/2007 | Hopkins et al. | |
| 2007/0266007 A1* | 11/2007 | Arrouye et al. | ..................... 707/3 |
| 2008/0162498 A1* | 7/2008 | Omoigui | ......................... 707/10 |
| 2008/0243784 A1* | 10/2008 | Stading | ............................. 707/3 |
| 2008/0243785 A1* | 10/2008 | Stading | ............................. 707/3 |
| 2008/0243786 A1* | 10/2008 | Stading | ............................. 707/3 |
| 2008/0244429 A1* | 10/2008 | Stading | ............................ 715/764 |
| 2009/0019023 A1* | 1/2009 | Arrouye et al. | ..................... 707/4 |
| 2009/0177989 A1 | 7/2009 | Ma et al. | |
| 2010/0121842 A1 | 5/2010 | Klinkott | |
| 2012/0110515 A1* | 5/2012 | Abramoff et al. | ............. 715/854 |

OTHER PUBLICATIONS

International Application No. PCT/US2012/023613, Written Opinion mailed May 3, 2012, 8 pgs.

* cited by examiner

*Primary Examiner* — Angelica Ruiz
(74) *Attorney, Agent, or Firm* — Schwegman Lundberg & Woessner, P.A.

(57) ABSTRACT

A data processing system receives a first user input comprising a search query. The data processing system displays in a search interface accessible across a plurality of computer application programs, a plurality of results matching the search query. The results are categorized into a plurality of categories and only a first subset of all results are displayed for each of the plurality of categories. The data processing system receives a second user input comprising a selection of one of the plurality of categories. In response to the second user input, the data processing system displays, in the search interface, a second subset of results, wherein the second subset is categorized into one or more subcategories of the selected category.

30 Claims, 13 Drawing Sheets

FACETED SEARCH RESULTS

TECHNICAL FIELD

This invention relates to the field of data management and, in particular, to faceted search results for the data.

BACKGROUND

Modern data processing systems, such as general purpose computer systems, allow the users of such systems to create a variety of different types of data files. For example, a typical user of a data processing system may create text files with a word processing program or may create an image file with an image processing program. Numerous other types of files are capable of being created, modified, edited, or otherwise used by one or more users for a typical data processing system. The large number of the different types of files that can be created or modified can present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash. Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a word processing file is the same as the searchable data for an image processing file, and this data typically includes the file name, the type of file, the date of creation, the date of last modification, the size of the file and certain other parameters which may be maintained for the file by the file management system. The file management system is an independent program that must be opened separately from other programs running in the data processing system. In existing systems, a user is typically not able to search for a file or program and narrow in on a desired result with a faceted search in a single interface without resorting to the separate file management system.

SUMMARY OF THE DESCRIPTION

A data processing system receives a first user input comprising a search query. The data processing system displays in a search interface accessible across a plurality of computer application programs, a plurality of results matching the search query. The results are categorized into a plurality of categories and only a first subset of all results are displayed for each of the plurality of categories. The data processing system receives a second user input comprising a selection of one of the plurality of categories. In response to the second user input, the data processing system displays, in the search interface, a second subset of results, wherein the second subset is categorized into one or more subcategories of the selected category and the second subset of results can be limited to a number of matching results which is less than the total number of matching results in the selected category.

In one embodiment, a data processing system can provide a display list of "top hits" from a search. In other words, the display of the results of the search are limited to a number of matches to the search that is less than all of the matches, and the top hits can be displayed in a menu or window which is not scrollable. The top hits menu can include a user selectable option (e.g., a command) to "show all" search results and when this option is selected; all of the matches (e.g., all of the search results) are displayed in another window which can be scrollable in order to view a potentially long list of search results. The top hits, in this embodiment, can include user selectable categories that allow a user to expand one or more categories within the top hits menu and concurrently to shrink or eliminate other categories not selected for expansion in the top hits menu. In this embodiment, when one or more categories within the top hits menu is expanded in response to a user selection of the one or more categories, other categories not selected are automatically shrunken or eliminated within the top hits menu, and this allows a user to selectively view more results within a category or subcategory, all within the context of the top hits menu without invoking the "show all" option.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
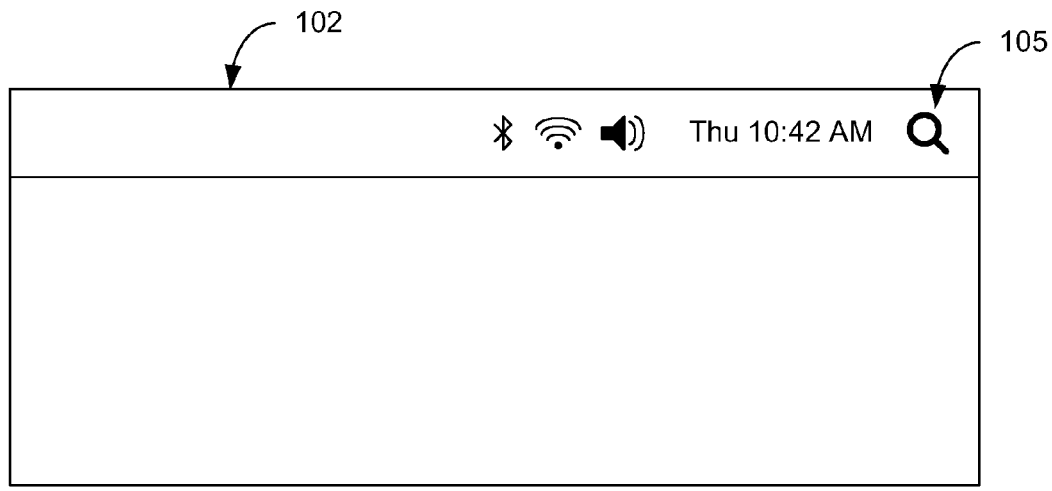
FIGS. 1A, 1B and 1C are diagrams illustrating a system-wide search input user-interface for faceted search results, according to an embodiment.
Figure 1B:
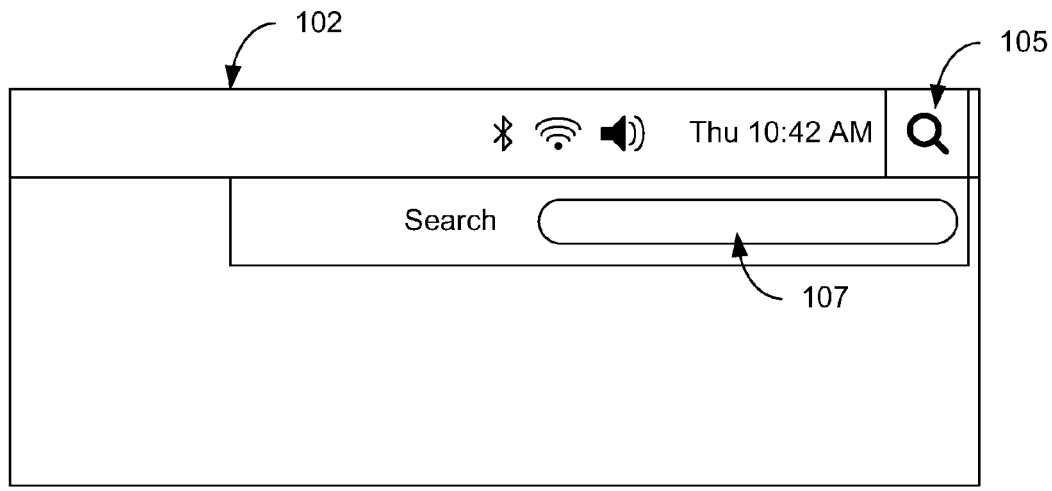
Figure 1C:
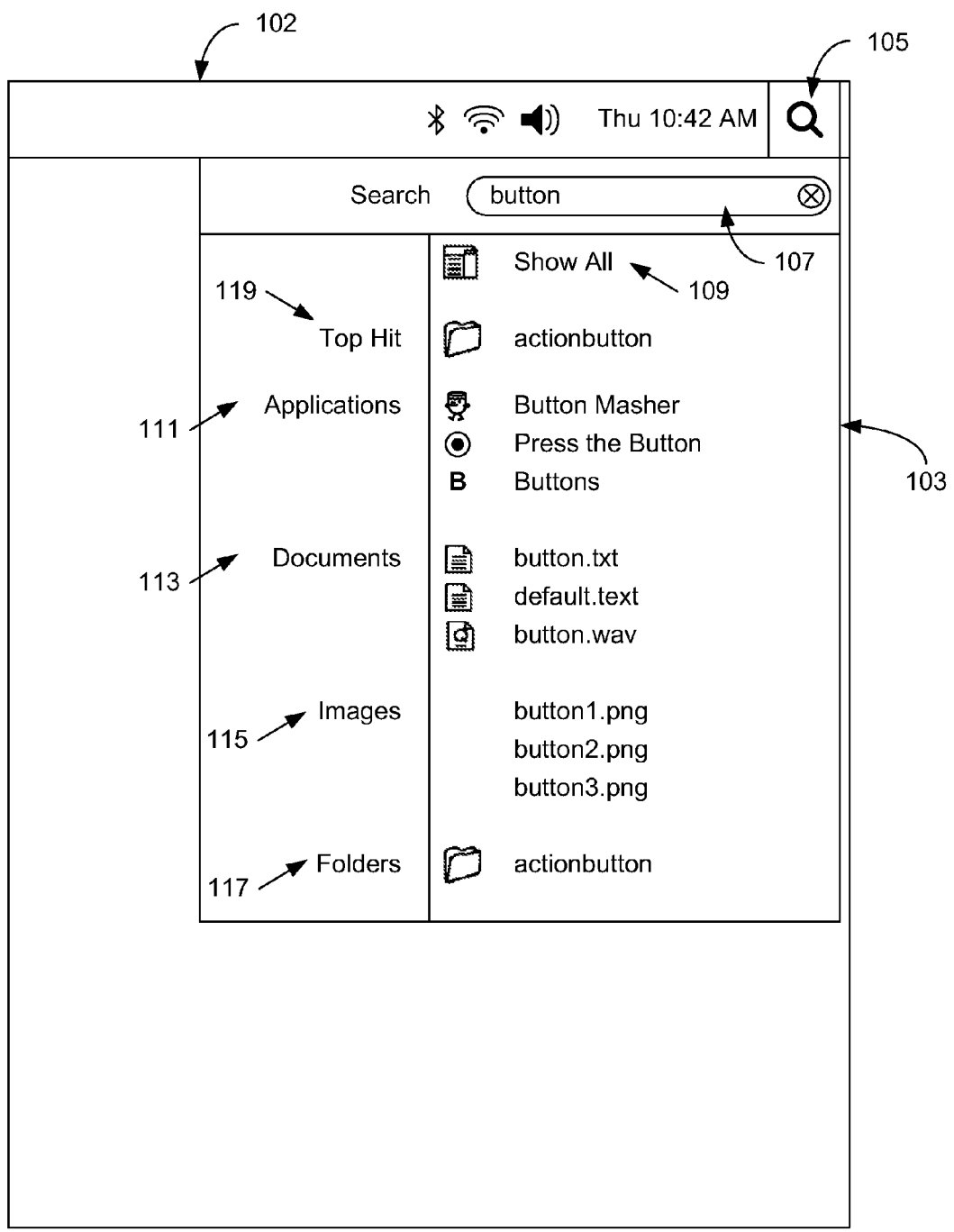

FIGS. 1A, 1B and 1C are diagrams illustrating a system-wide search input user-interface for faceted search results, according to an embodiment. In one embodiment, the user interface may be available on the entire system for all applications which run on the system and all files and metadata, and even address book entries within an address book program, such as a personal information manager, and calendar entries within a calendar program, and emails within an email program, etc. FIG. 1A shows a portion of a display controlled by a data processing system. This portion includes a menu bar 102 which has at one end a search interface command 105. Menu bar 102 may be part of a main operating system user-interface which is displayed (e.g., at the top of the screen), across all applications running in the data processing system. In some embodiments menu bar 102 may display additional icons for various purposes, such as a Bluetooth connectivity indicator, a wireless network strength indicator, a system volume level indicator, a date and time indicator, or other icons. The user can select the search interface command 105 by positioning a cursor, using a mouse for example, over the search interface command 105 and by pressing a button or by otherwise activating or selecting the command. This may cause a display of a text entry region 107 into which a user can enter text, as shown in FIG. 1B.

In the example shown in FIG. 1C, which is a portion of the display, the user has entered the text "button" causing the display of a search interface, including search result region 103, immediately below a "show all" command region 109, which is itself immediately below the text entry region 107. In one embodiment the search interface may be a menu, however in other embodiments, it may be a window, or some other type of user interface. In one embodiment the search interface may display a limited number of results (as opposed to all of the results matching the search query), and it is not necessary to scroll in the interface to see the displayed results. In one exemplary embodiment, the system begins performing the search and begins displaying the results of the search as the user types text into the text entry field 107. The search results may be organized by categories and may be displayed as a short list which is intentionally abbreviated in order to present only a selected number of the most relevant (scored) matches or hits for the search query. The user can ask for the display of all the hits by selecting a command, such as the "show all" command 109.

It can be seen that the hits or matches are grouped into categories (e.g., "Applications", "Documents", "Images" and "Folders") shown by categories 111, 113, 115 and 117 within the search result region 103. In some embodiments, depending on the search query, a large number of hits may be obtained, while only a few are shown in the search result region 103. Each category may be restricted in terms of the number of items displayed within the search result region 103 in order to permit the display of multiple categories at the same time within the search result region. For example, the number of hits in the documents category may greatly exceed the available display space within the search result region 103, but the hits for this category are limited to a predetermined or dynamically determinable number of entries within the search result region 103 for the category 113. An additional category, "Top Hit" 119 may be selected based on a scoring or relevancy using techniques which are known in the art. The "Top Hit" category 119 may include one result, deemed most likely to be what the user is searching for. The user may also select the "Show All" command 109 causing the display of a window, such as window 701 shown in FIG. 7. This window may be, for example, part of a file management system program and be opened separately from the search interface.

Figure 2A:
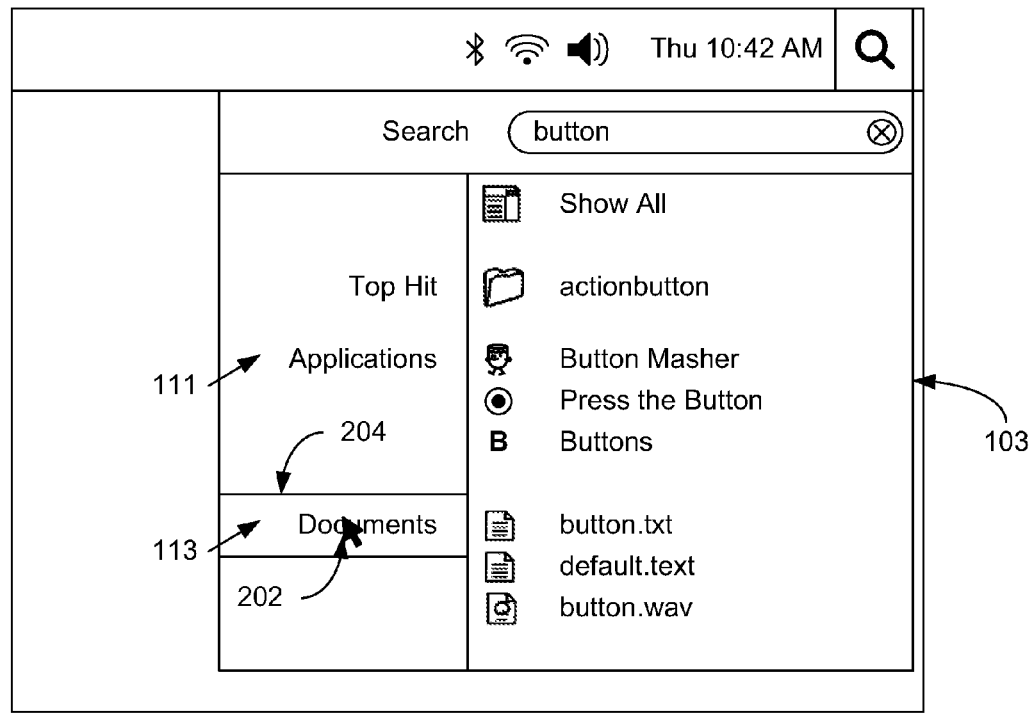
FIGS. 2A, 2B and 2C are diagrams illustrating a system-wide search input user-interface for faceted search results, according to an embodiment.
Figure 2B:
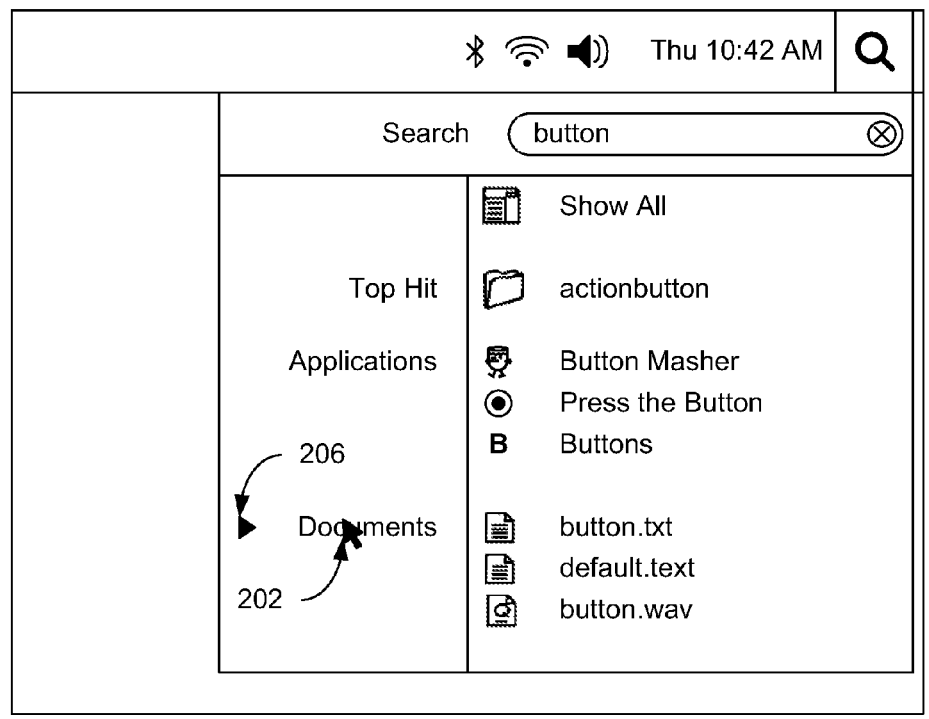
Figure 2C:
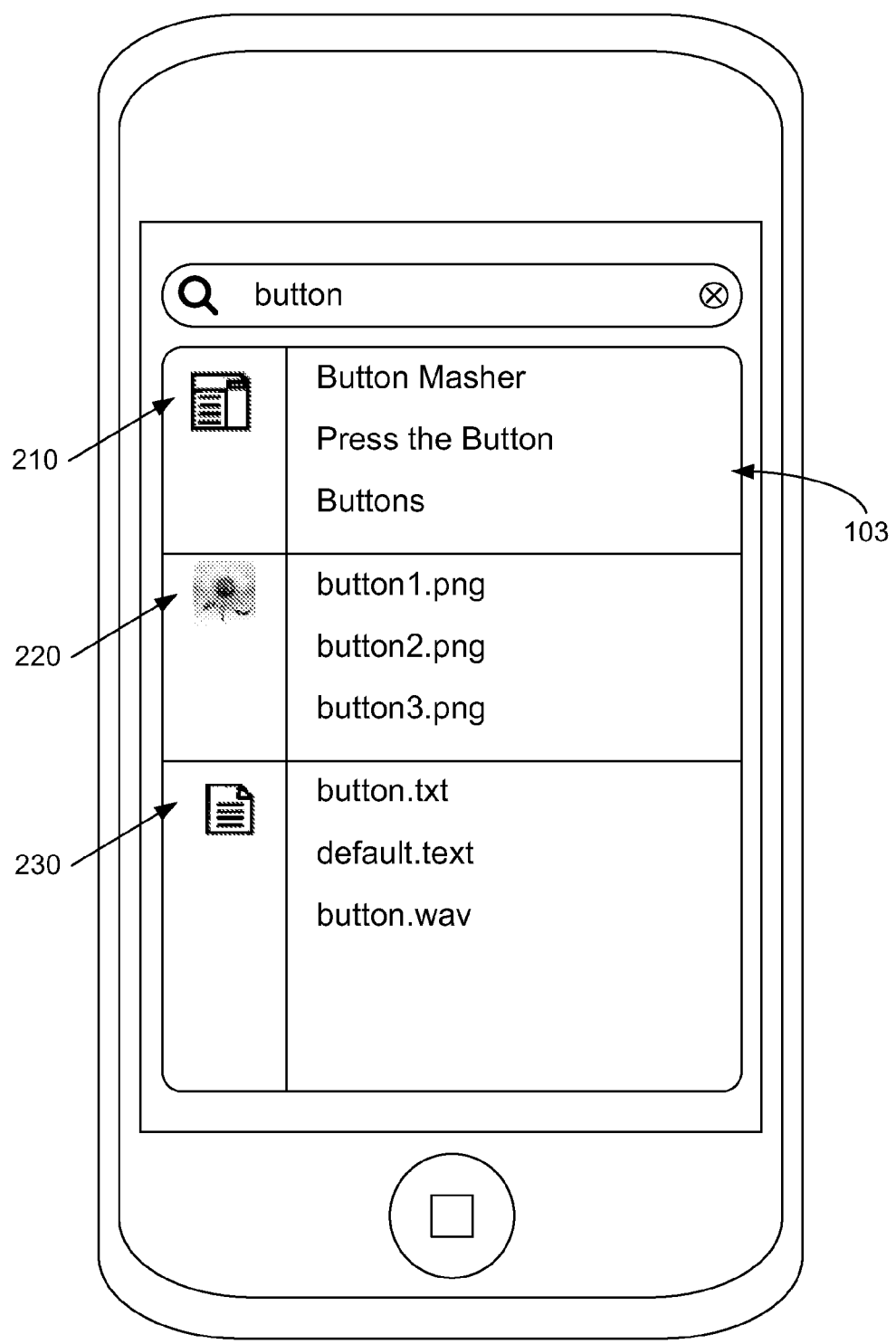

FIGS. 2A, 2B and 2C are diagrams illustrating a system-wide search input user-interface for faceted search results, according to an embodiment. As discussed above, the search result region 103 may include a number of hits or matches organized into categories (e.g., 111 and 113). The user can select any of the displayed search results by positioning the cursor, using a mouse for example, over the desired result and pressing a mouse button or by otherwise activating or selecting the result. The selections or other user actions can also be through a touch interface, such as a touch screen. This selection may cause the data processing system to open a file or program corresponding to the selected result in a new window.

In some embodiments, the search interface may provide faceted search results, which may allow multiple classifications of an object and allow the user to find a desired result by filtering available information. For example, the user may select one of the displayed category names, such as the category "Documents" 113. The user may select the category with a cursor 202, or as described above, and an indication of the selection may be provided. For example, as shown in FIG. 2A, the selected category 113 may be highlighted 204, or as shown in FIG. 2B, an arrow or other indicator 206 may be displayed next to the selected category. In other embodiments, the category selection may be indicated in some other fashion. Upon selection of a displayed category, the search interface may be updated, as will be described below.

FIG. 2C illustrates one embodiment of a user-interface which may be implemented on a mobile device, such as for example, a smartphone or tablet computing device. In this embodiment, the search interface may also include search results displayed in a search results area 103. The search results may be organized into categories, similarly to the interfaces shown in FIGS. 2A and 2B, however in this embodiment, the categories may be represented by icons, such as icons 210, 220 and 230. The icons 210, 220 and 230 may serve the same function as the category names discussed above, however they may save space on the smaller screen of the mobile device. In addition, the icons 210, 220 and 230 may be selected by the user to implement similar faceted search techniques, as will be discussed further below.

Figure 3:
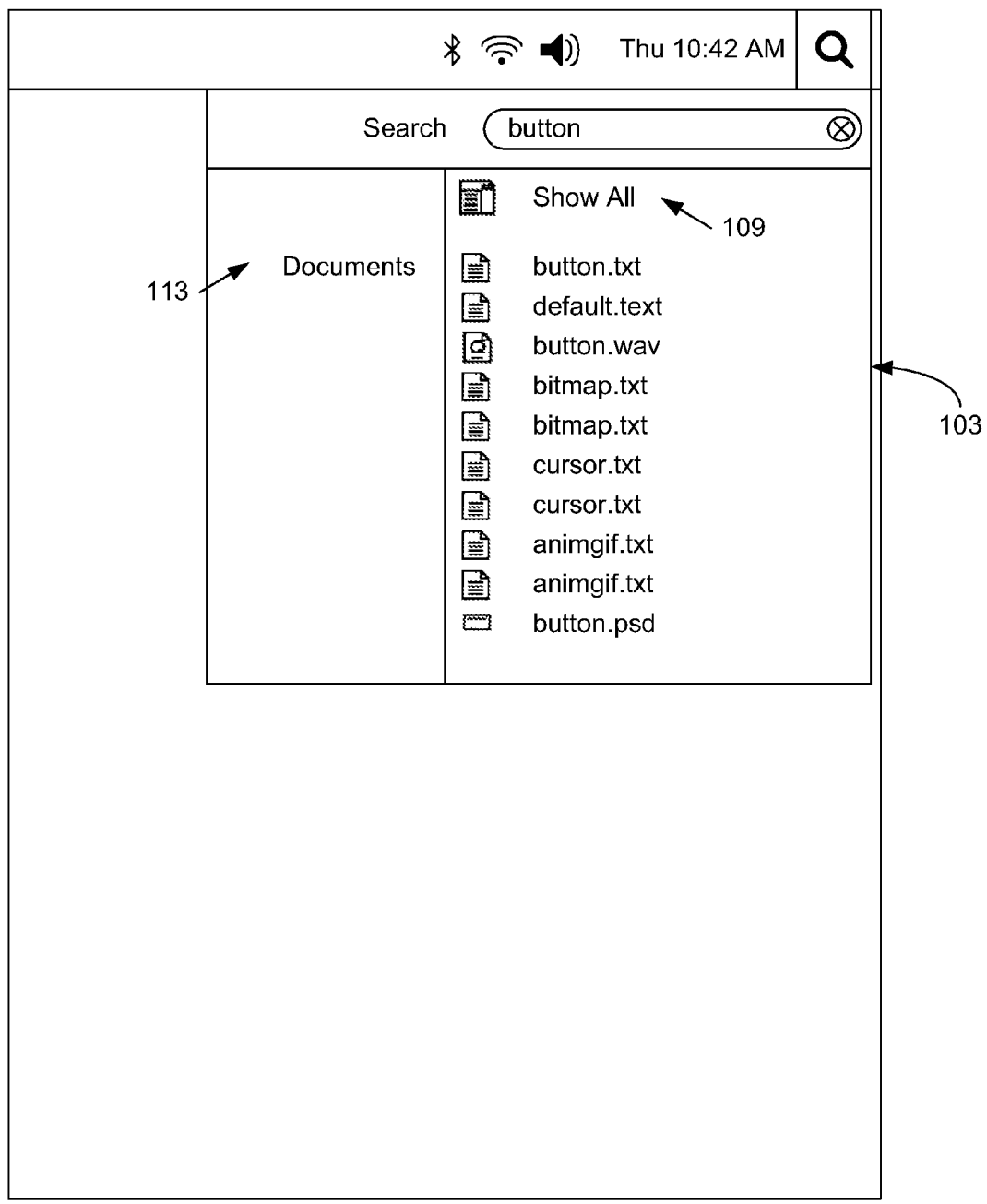
FIG. 3 is a diagram illustrating faceted search results in a system-wide search input user-interface, according to an embodiment.

FIG. 3 is a diagram illustrating faceted search results in a system-wide search input user-interface, according to an embodiment. In the example shown in FIG. 3 the user has selected the category "Documents" 113, as described above. In this embodiment, the search results region 103 has updated to display additional hits for the search query button that are categorized as "Documents." This list of hits in search results region 103 may still be an abbreviated list, although showing more results than in FIG. 1C. In addition, the remaining categories (i.e., those that were not selected: 111, 115, 117) may be removed from the search interface. In some embodiments, the "Show All" command 109 remains in the search interface. If the user selects the "Show All" command 109 at this point (i.e., after having selected the category "Documents" 113), the system may display a window, such as window 1001 shown in FIG. 10, showing all of the results that are categorized as "Documents." As discussed above, this window may be part of a file management system program and be opened separately from the search interface.

Figure 4A:
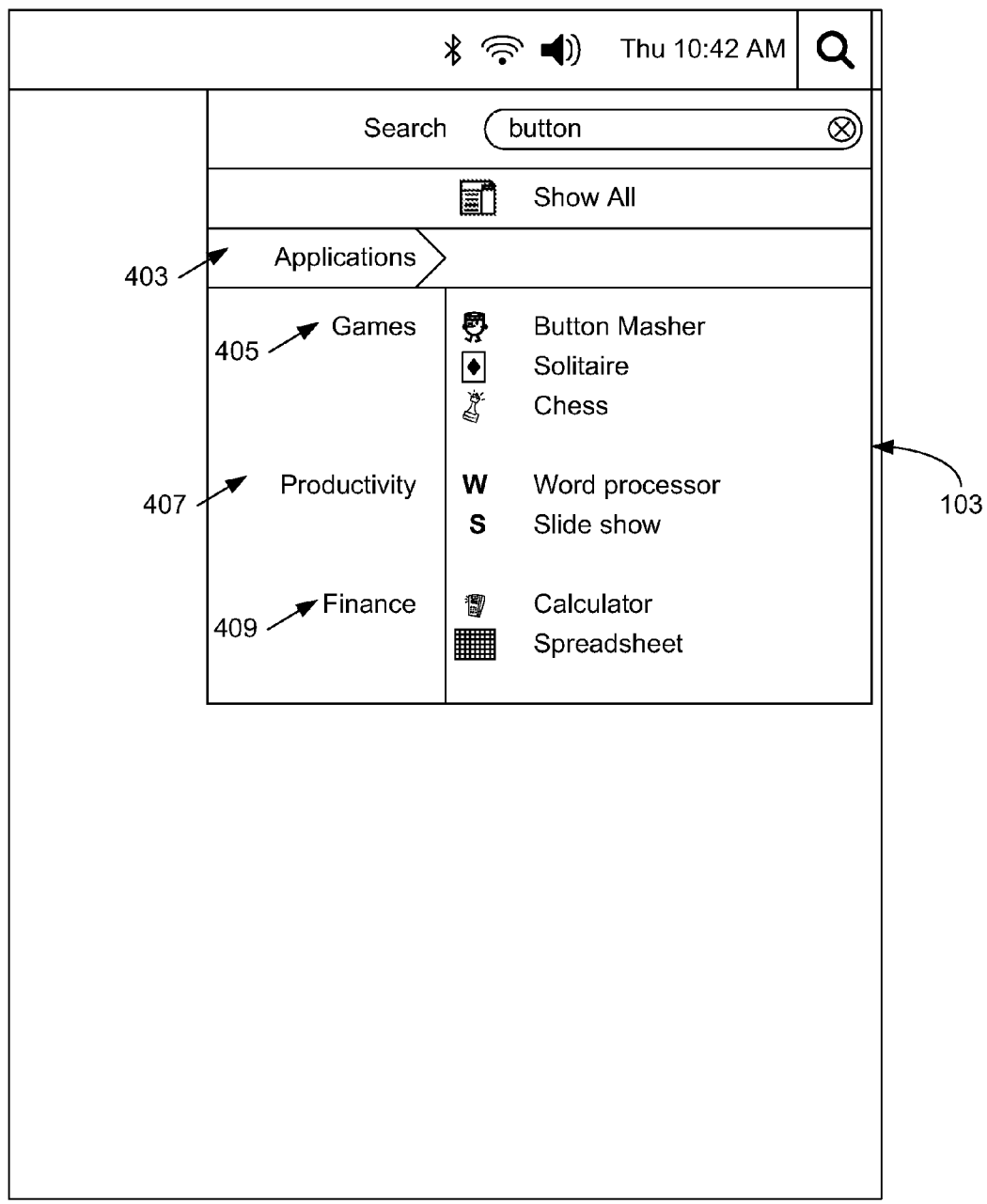
FIGS. 4A, 4B and 4C are diagrams illustrating faceted search results in a system-wide search input user-interface, according to an embodiment.
Figure 4B:
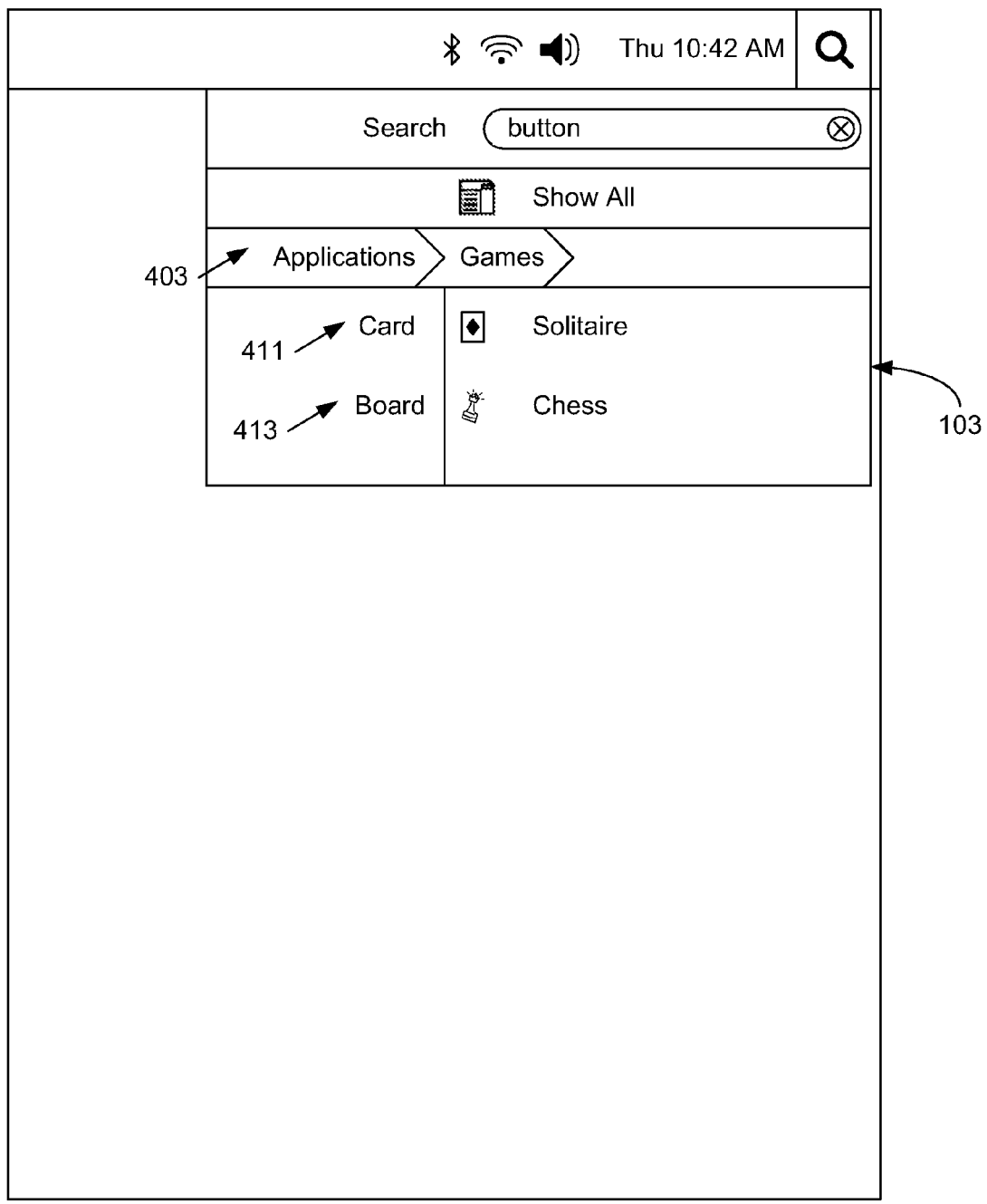
Figure 4C:
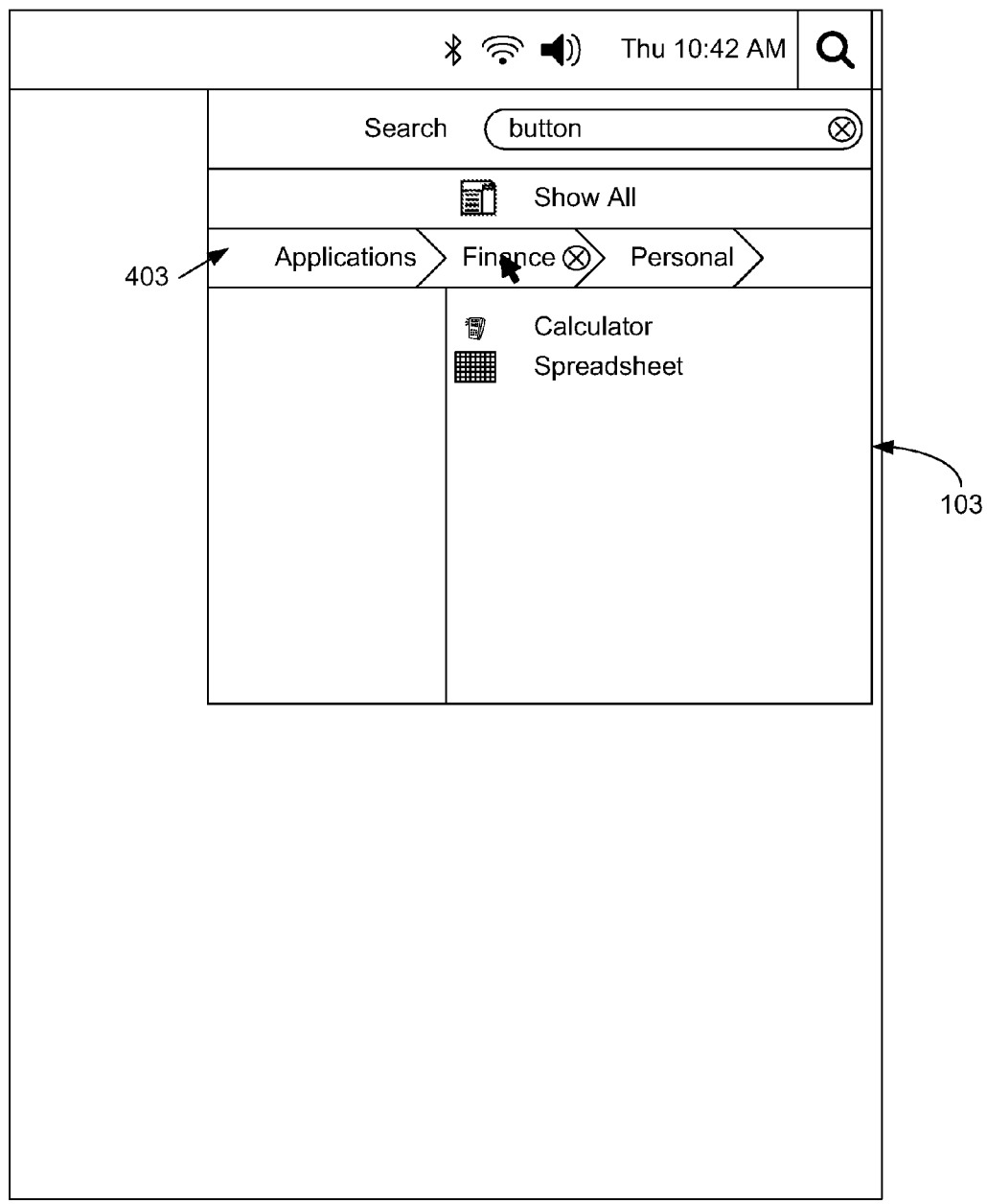

FIGS. 4A, 4B and 4C are diagrams illustrating faceted search results in a system-wide search input user-interface, according to an embodiment. In the example shown in FIG. 4A the user has selected the category "Applications." The category selection may be made according to the description provided above. In this embodiment, rather than merely displaying additional hits for the selected category, as described with respect to FIG. 3, the selected category "Applications" is displayed in a selected category region 403. In addition, one or more subcategories 405, 407 and 409 of the selected category are displayed. Search results region 103 may also be updated with the previously displayed hits from the selected category, and/or additional hits organized by subcategory. For example, for the selected category "Applications," the subcategories may include "Games" 405, "Productivity" 407, and "Finance" 409. In other embodiments, there may be more or fewer or different subcategories specific to the selected subcategory. The hits displayed in search results region 103 for each subcategory may be restricted in terms of the number of items displayed in order to permit the display of multiple subcategories at the same time within the search results region 103. At this or any point, the user can select any of the displayed search results which may cause the data processing system to open a file or program corresponding to the selected result in a new window.

In another embodiment, rather than selected a search result, the user may select one of the subcategories. In the example of FIG. 4B, the user has further selected the subcategory "Games." The selected subcategory "Games" may be displayed in selected category region 403, along with the selected category "Applications." In addition, one or more additional subcategories (i.e., sub-subcategories) 411 and 413 may be displayed. Search results region 103 may also be updated with the hits organized by subcategory, as shown. In another embodiment, selection of a subcategory (e.g., Games) may expand the list of displayed hits in search results region 103, similarly to the display as shown in FIG. 3. There may be any number of levels of categories and subcategories according to a category hierarchy stored and managed by the data processing system. In addition, each item may be categorized into any number of categories and subcategories, so that the item may be located in multiple ways.

In one embodiment, after the user has selected one or more categories and/or subcategories, and the search results in search results region 103 have been updated accordingly, the user may broaden the search results by removing one or more of the selections from selected category region 403. In one example, as shown in FIG. 4C, the user may place the mouse cursor over one of the previously selected categories or subcategories in selected category region 403, such as "Finance" and an "X" icon may appear. The user may then select the "X" icon, such as by clicking on it with the mouse, to remove the subcategory "Finance" from the search results. In other embodiments, the user may take some other action to remove a category or subcategory. Upon removing "Finance," the search results displayed in search results region 103 may be updated to include results that are categorized as "Applications" and "Personal," as those are the remaining category selections. In some embodiments, this may increase the number of displayed results, as the search criteria is broadened, however the number of displayed results may not exceed the limit for the search interface.

Figure 5A:
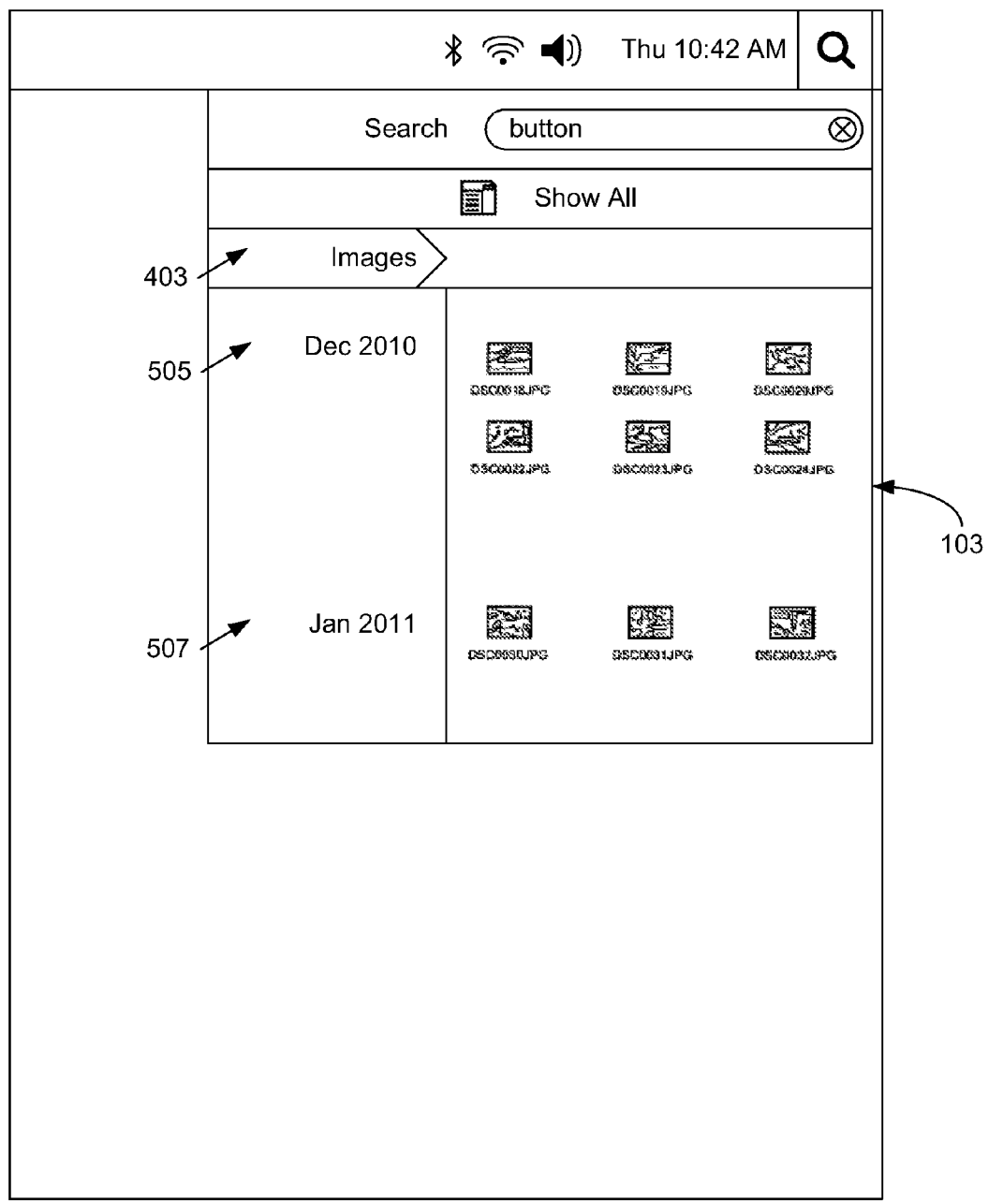
FIGS. 5A and 5B are diagrams illustrating faceted search results in a system-wide search input user-interface, according to an embodiment.
Figure 5B:
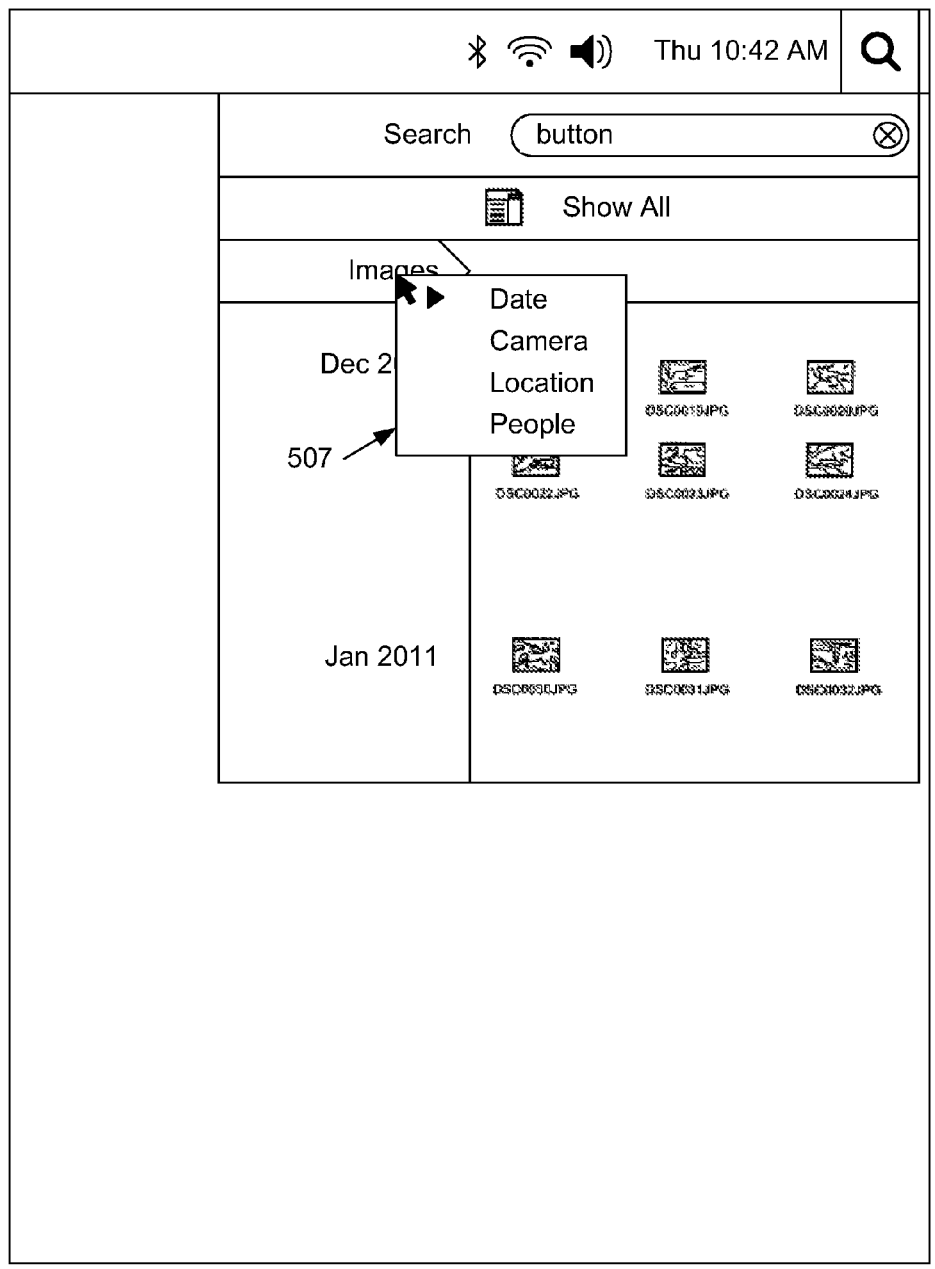

FIGS. 5A and 5B are diagrams illustrating faceted search results in a system-wide search input user-interface, according to an embodiment. In the example shown in FIG. 5A the user has selected the category "Images," for example, from the list of categories in FIG. 1C. The category selection may be made according to the description provided above. In this embodiment, the selected category "Images" is displayed in a selected category region 403. In addition, one or more subcategories 505 and 507 of the selected category are displayed. Search results region 103 may also be updated with the previously displayed hits from the selected category, and/or additional hits organized by subcategory (e.g., by date: December 2010, January 2011, etc.). In one embodiment, as shown in FIG. 5A, the items in search results region 103 may be displayed in a different form than a list of all the items matching the selected category. For example, for the category "Images," the results may be displayed as thumbnails. These thumbnails display a scaled down version of the matching image itself, so that the user can see each specific result. The items in search results region 103 may be displayed in a number of other different ways as well, including for example, tiles, icons, detailed lists, etc. The manner in which search results region 103 is configured can be controlled, for example, by user input.

In another embodiment, as shown in FIG. 5B, the displayed subcategories can also be configured by the user. For example, the user may place the cursor over the selected category bringing up a subcategory selection interface 512. Interface 512 may have a number of subcategory options, from which the user may select. The subcategory options may be tailored to the specific category that was previously selected. In this embodiment, for the selected category "Images," the subcategory options may include "date," "camera," "location," "people," or other options. One option (e.g., "date") may be configured as a default option, however, if the user selects one of the other options (e.g., using a mouse cursor or touch screen), the displayed subcategories may be updated along with the displayed results.

In another embodiment, the displayed subcategories may be dynamically selected by the system. The system may determine which subcategories may be best suited to display the results of the search in a useful manner for the user. The system may use metadata stored with each item to make this determination. For example, for the selected category "Images," there may be metadata stored with each image indicating which camera was used to capture the image. If all the items in the category "Images" were taken with the same camera, then sorting the results by the subcategory "Camera" would not be particularly useful to a user. In that case, the system may select another subcategory (e.g., date).

Figure 6:
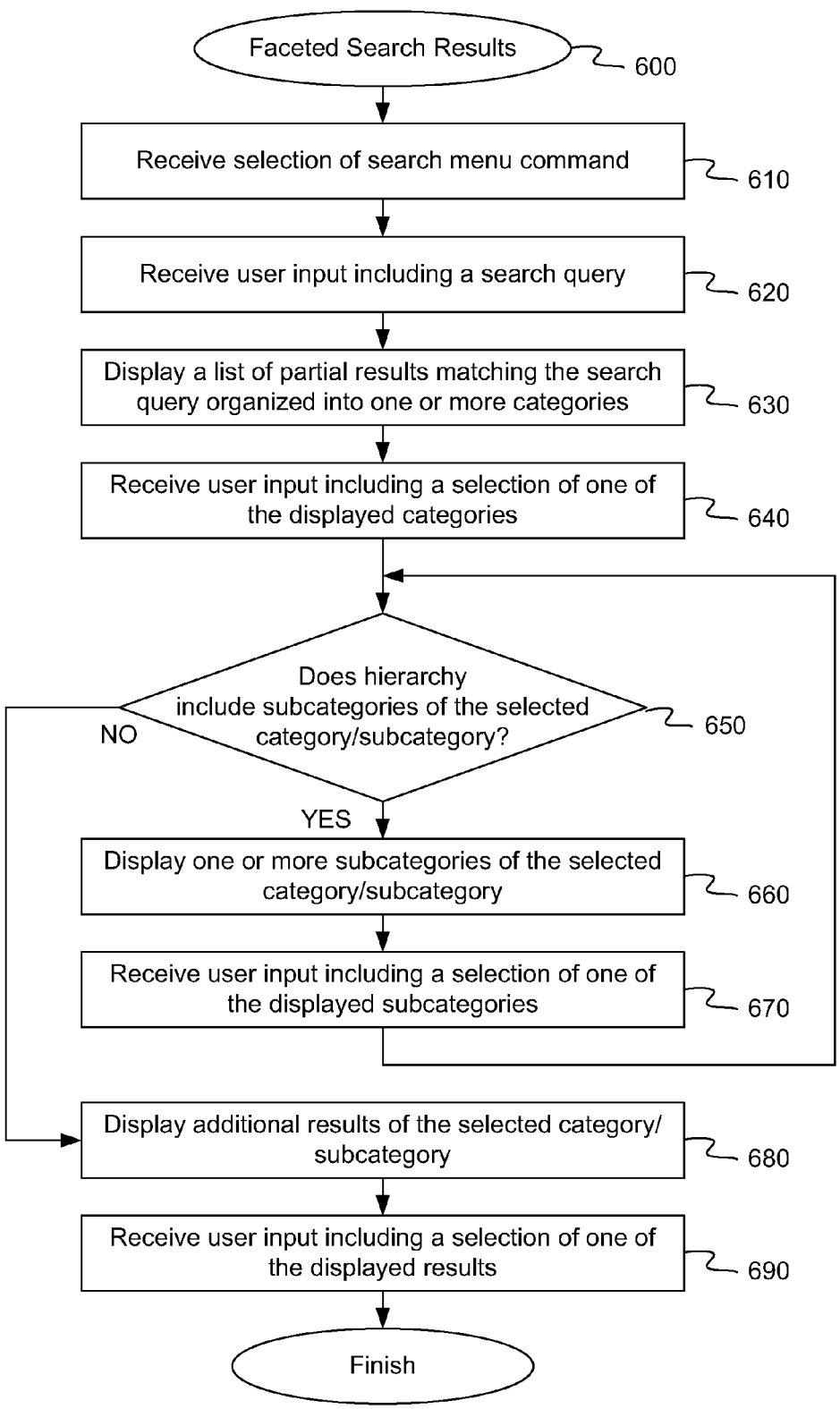
FIG. 6 is a flow diagram illustrating a faceted search results method, according to an embodiment.

FIG. 6 is a flow chart illustrating a faceted search results method, according to an embodiment of the present invention. The method 600 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to display faceted search results for a user. In one embodiment, method 600 may be performed by the data processing system 101 shown in FIG. 1 or the data processing system 800 shown in FIG. 8.

Referring to FIG. 6, at block 610, method 600 receives a selection of a search interface command 105. The search interface command 105 may be part of menu bar 102 which is part of a main operating system user-interface displayed across all applications running in the data processing system. The user can select the search interface command 105 (e.g., with a mouse cursor or touch screen), causing a display of a text entry region 107 into which a user can enter text. At block 620, method 600 receives user input including a search query in text entry region 107. The search query may be a textual search term entered with a textual input device, such as a keyboard. At block 630, method 600 begins performing a search based on the search query and begins displaying the results of the search as the user types text into the text entry field 107. The search results may be organized by categories and may be displayed as a short list (e.g., a "top hits" list) which is intentionally abbreviated in order to present only a selected number of the most relevant (scored) matches or hits for the search query. At block 640, method 600 receives a user input including a selection of one of the displayed categories. U.S. Pat. No. 7,437,358, which is hereby incorporated by reference herein, provides further examples of top hits lists.

At block 650, method 600 determines whether a hierarchy of categories includes any subcategories for the selected categories. The hierarchy may be stored in memory by the data processing system. If at block 650, method 600 determines that there are subcategories for the selected category, at block 660, method 600 displays one or more of the subcategories. The results matching the search query may be displayed in the search results region 103 may also be updated with the previously displayed hits from the selected category, and/or additional hits, organized by subcategory. This hits displayed in search results region 103 for each subcategory may be restricted in terms of the number of items displayed in order to permit the display of multiple subcategories at the same time within the search results region 103. At block 670, method 600 receives user input including a selection of one of the displayed subcategories.

Method 600 returns to block 650 to determine whether the hierarchy includes any additional subcategories. If there are additional subcategories in the hierarchy, they may be displayed as described above with respect to blocks 660 and 670. If at block 650, method 600 determines that there are no additional subcategories for the selected category, at block 680 method 600 displays additional results of the selected category. The additional results may include more results than were previously displayed, but still may be limited to a set number of results at block 680, rather than all results matching the search query. In order to see all of the search results, a user can selection "show all" to cause the display of window 701, for example, shown in FIG. 7. At block 690, method 600 receives user input including a selection of one or more of the displayed results. This user input may also be received at any point during which results of the search query are displayed in search results region 103 (e.g., when there were multiple categories or subcategories displayed). An appropriate program may open the selected result.

Figure 7:
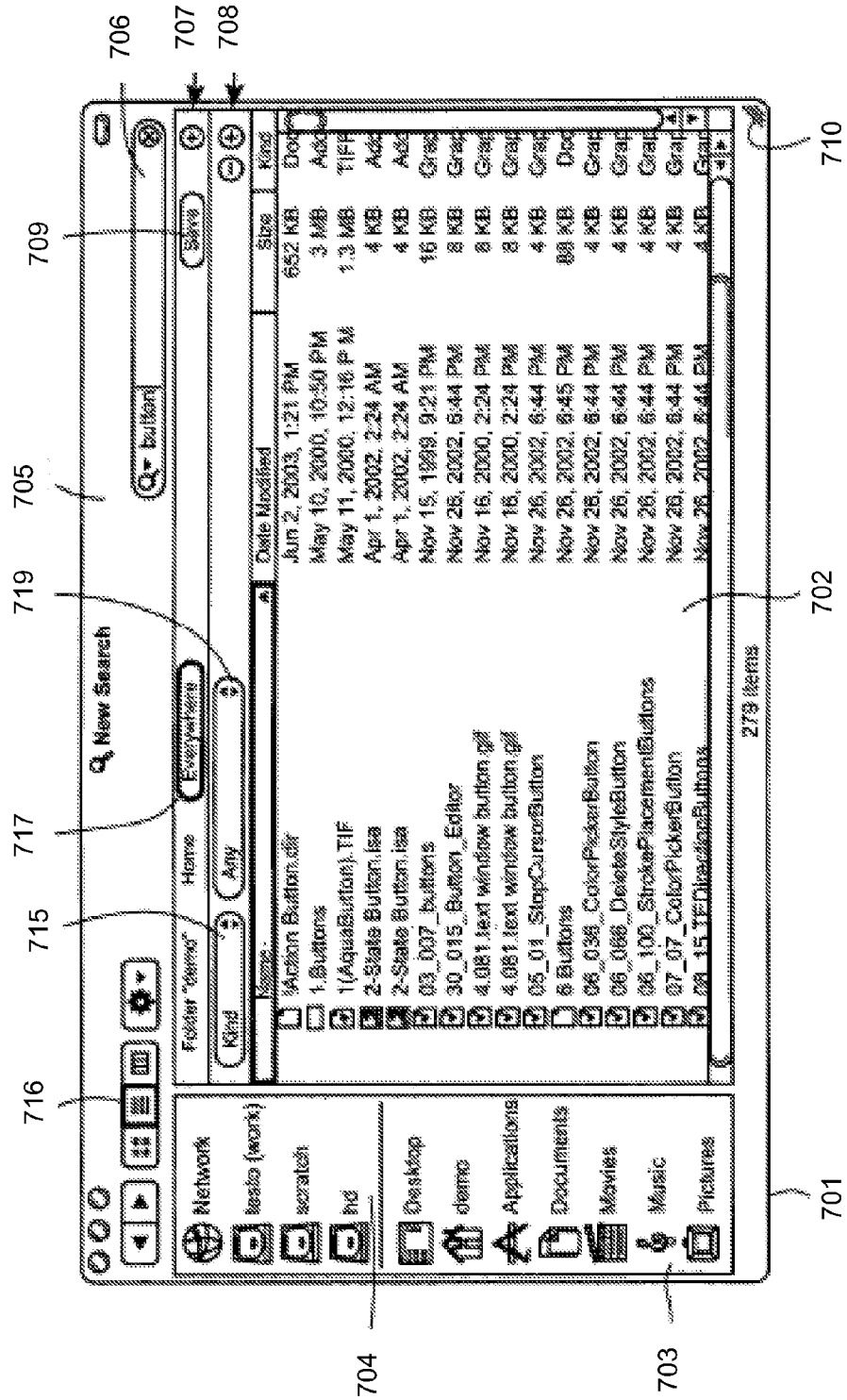
FIG. 7 is a diagram illustrating a user-interface presented by a file management system program, according to an embodiment.

FIG. 7 is a diagram illustrating a window 701 which displays search results within a display region 702, according to an embodiment. Window 701 may be part of a user interface created by a file management system program. In one embodiment, window 701 may be opened by the file management system program upon receiving the selection of the "Show All" command 109, as shown in FIG. 1C. The window 701 may be a closeable, minimizeable, resizeable, and moveable window having a resizing control 710, a title bar 705 which may be used to move the window, a text entry region 706, a user configurable portion 703, and a system specified portion 704. The window 701 may further includes buttons for selecting various views, including an icon view, a list view, and a column view. In this embodiment, the list view button 716 has been selected, causing the display of the search results in a list view manner within the display region 702. It can be seen that the text ("button") has been entered into the text entry region 706 and this has caused the system to respond with the search results shown in the display region 702. The user has specified a search in every location by selecting "everywhere" button 717. Further, the user has searched for any kind of document by selecting the "kind" option from the pull down menu 715 and by selecting the "any" option in the pull down menu 719. The where or location slice 707 includes a "+" button which may be used to add further search parameters, and similarly, the slice 708 includes a "+" and a "−" button for adding or deleting search parameters, respectively. The slice 707 further includes a "save" button 709 which causes the current search query to be saved in the form of a folder which is added to the user configurable portion 703 for use later. The search input user interface shown in FIG. 7 is available within, in certain embodiments, each and every window controlled by a graphical user interface file management system. This interface includes the text entry region 706, as well as the slices 707 and 708.

Figure 8:
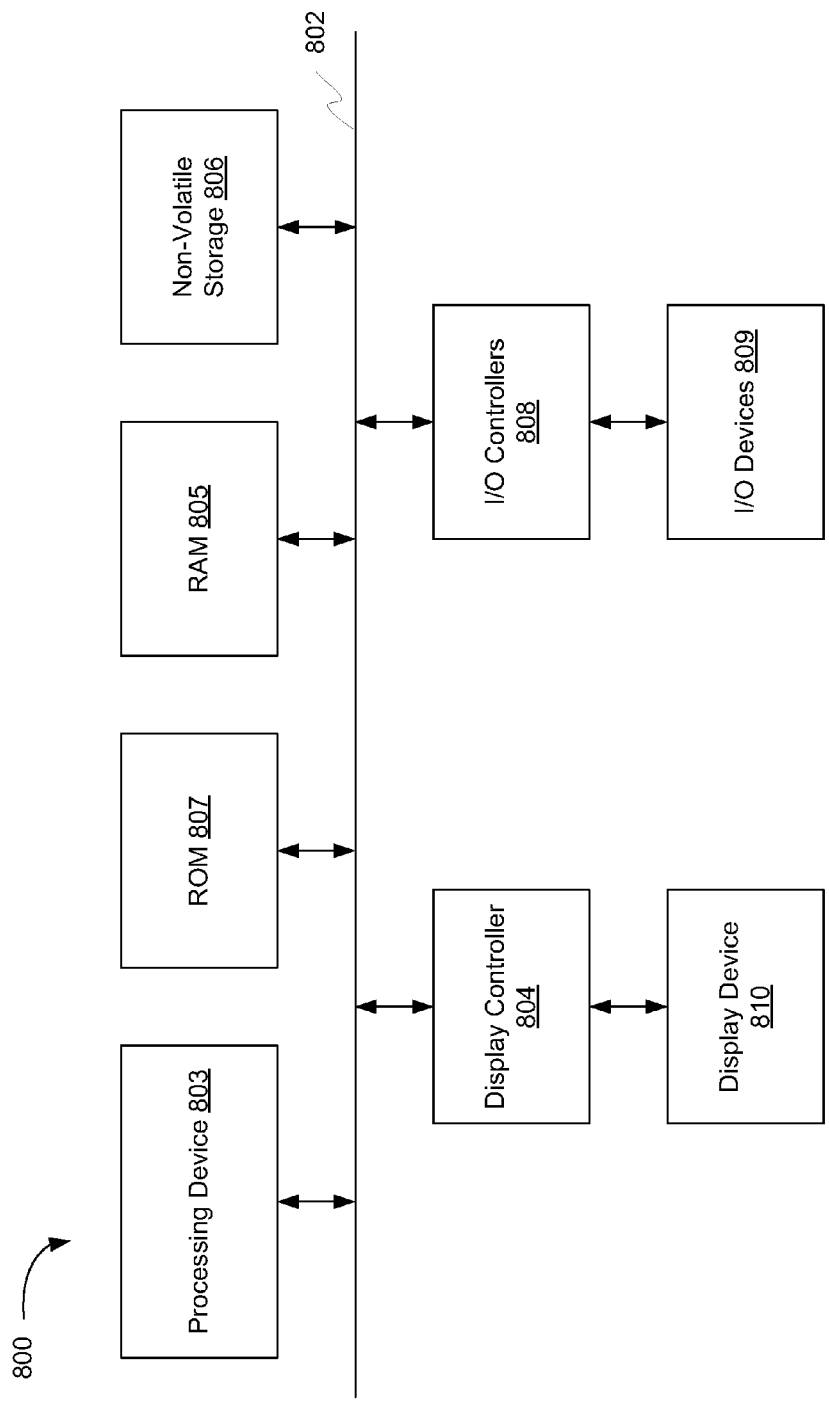
FIG. 8 is a block diagram illustrating a data processing system for implementing faceted search results, according to an embodiment.

FIG. 8 is a block diagram illustrating a data processing system for implementing faceted search results according to an embodiment. In one embodiment, data processing system 800 may be a general purpose computer system which may operate in any of the various methods described herein. In other embodiments, data processing system 800 may be some other system, such as a desktop computer, laptop computer, notebook computer, netbook, tablet computing system, smartphone, or other computing system. While FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 802 which is coupled to a processing device (e.g., microprocessor(s)) 803, a ROM (Read Only Memory) 807, volatile RAM (Random Access Memory) 805 and a non-volatile storage 806. The bus 802 interconnects these various components together and also interconnects these components 803, 807, 805, and 806 to a display controller 804 and display device 810 and to peripheral devices such as input/output (I/O) devices which may be one or more touch screens or touch interface devices, mice, keyboards, modems, network interfaces, printers and other devices which are well known in the art. Typically, the input/output devices 809 may be coupled to the system 800 through input/output controllers 808. The volatile RAM 805 may be implemented as dynamic RAM (DRAM) which requires power continually in order to refresh or maintain the data in the memory. Non-volatile storage 806 may include a magnetic hard drive, an optical drive, a DVD RAM or other types of memory systems which maintain data (e.g. large amounts of data) even after power is removed from the system. Typically, the mass storage 806 will also be a random access memory, although this is may not be required. While FIG. 8 shows that the mass storage 806 is a local device coupled directly to the rest of the components in the data processing system 800, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers and/or adapters, as is well known in the art. In one embodiment the I/O controller 808 includes a USB (Universal Serial Bus) adapter for controlling USB peripherals and an IEEE 1394 controller for IEEE 1394 compliant peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 807, RAM 805, mass storage 806 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing device 803.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium can be tangible and non-transitory media, and may include, but is not limited to, magnetic storage medium (e.g., floppy diskette); optical storage medium (e.g., CD-ROM); magneto-optical storage medium; read-only memory (ROM); random-access memory (RAM) such as DRAM; erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A machine implemented method comprising:
   receiving a first user input comprising a search query;
   displaying, by a data processing system, in a search interface accessible across a plurality of computer application programs, a plurality of results from a search performed across files and programs accessible by the data processing system, wherein the plurality of results matches the search query and are categorized into a plurality of categories, only a first subset of the plurality of results are displayed for each of the plurality of categories, and the results in the first subset are displayed grouped together in proximity to a displayed representation of a corresponding category;
   receiving a second user input comprising a selection of one of the displayed representations of the plurality of categories; and
   in response to the second user input, displaying, in the search interface, a second subset of the plurality of results, wherein the second subset matches the search query and is categorized into a plurality of subcategories of the selected category, and the results categorized into each subcategory is displayed grouped together in proximity to a displayed representation of a corresponding subcategory.

2. The method of claim 1, wherein the second subset of results includes results not previously displayed in the first subsets of results, and wherein the search interface includes a user selectable option to change to a display of all results within at least one category or subcategory.

3. The method of claim 1, further comprising:
   in response to the second user input, displaying, in the search interface, more results matching the search query in the selected category than were initially displayed for the selected category.

4. The method of claim 1, further comprising:
determining whether a hierarchy of categories includes additional subcategories of the selected category.

5. The method of claim 1, wherein the subcategories are specific to the selected category.

6. The method of claim 1, wherein the subcategories are user-configurable.

7. The method of claim 1, further comprising:
receiving a third user input, the third user input comprising a selection of one of the displayed results; and
in response to the third user input, opening the selected result.

8. The method of claim 1, further comprising:
receiving a fourth user input, the fourth user input comprising a removal of one of a selected category or subcategory; and
in response to the fourth user input, updating the displayed results.

9. The method of claim 1, further comprising:
selecting, for display within each category, a limited number of results from the first subset of results for display within each of the plurality of categories based on analysis of the subset of results.

10. The method of claim 1, further comprising:
selecting, for display within each subcategory, a limited number of results from the second subset of results for display within each of the plurality of subcategories based on analysis of the subset of results.

11. The method of claim 1, wherein the subcategories are determined automatically based on attributes of the second subset of the plurality of results.

12. The method of claim 1, wherein the subcategories are determined automatically based on attributes of the second subset of the plurality of results.

13. The method of claim 1, wherein the plurality of categories and subcategories are organized according to a category hierarchy stored and managed by the data processing system.

14. The method of claim 1, wherein the subcategories are dynamically selected for display based on analysis of metadata stored with each item in the selected category.

15. A non-transitory machine readable storage medium storing instructions which when executed cause a data processing system to perform a method comprising:
receiving a first user input comprising a search query;
displaying, by the data processing system, in a search interface accessible across a plurality of computer application programs, a plurality of results from a search performed across files or programs accessible by the data processing system, wherein the plurality of results matches the search query and are categorized into a plurality of categories, only a first subset of the plurality of results are displayed for each of the plurality of categories, and the results in the first subset are displayed grouped together in proximity to a displayed representation of a corresponding category;
receiving a second user input comprising a selection of one of the displayed representations of the plurality of categories; and
in response to the second user input, displaying, in the search interface, a second subset of the plurality of results, wherein the second subset matches the search query and is categorized into a plurality of subcategories of the selected category, and the results categorized into each subcategory is displayed grouped together in proximity to a displayed representation of a corresponding subcategory.

16. The storage medium of claim 15, wherein the second subset of results includes results not previously displayed in the first subsets of results, and wherein the search interface includes a user selectable option to change to a display of all results within at least one category or subcategory.

17. The storage medium of claim 15, the method further comprising:
in response to the second user input, displaying, in the search interface, more results matching the search query in the selected category than were initially displayed for the selected category.

18. The storage medium of claim 15, the method further comprising:
determining whether a hierarchy of categories includes additional subcategories of the selected category.

19. The storage medium of claim 15, wherein the subcategories are specific to the selected category.

20. The storage medium of claim 15, wherein the subcategories are user-configurable.

21. The storage medium of claim 15, the method further comprising:
receiving a third user input, the third user input comprising a selection of one of the displayed results; and
in response to the third user input, opening the selected result.

22. The storage medium of claim 15, the method further comprising:
receiving a fourth user input, the fourth user input comprising a removal of one of a selected category or subcategory; and
in response to the fourth user input, updating the displayed results.

23. A system comprising:
a processor;
a storage device coupled to the processor and configurable for storing instructions, wherein the instructions configure the processor to:
receive a first user input comprising a search query;
display in a search interface accessible across a plurality of computer application programs, a plurality of results from a search performed across files or programs accessible by the data processing system, wherein the plurality of results matches the search query and are categorized into a plurality of categories, only a first subset of the plurality of results are displayed for each of the plurality of categories, and the results in the first subset are displayed grouped together in proximity to a displayed representation of a corresponding category;
receive a second user input comprising a selection of one of the displayed representations of the plurality of categories; and
in response to the second user input, display, in the search interface, a second subset of the plurality of results, wherein the second subset matches the search query and is categorized into a plurality of subcategories of the selected category, and the results categorized into each subcategory is displayed grouped together in proximity to a displayed representation of a corresponding subcategory.

24. The system of claim 23, wherein the second subset of results includes results not previously displayed in the first subsets of results, and wherein the search interface includes a user selectable option to change to a display of all results within at least one category or subcategory.

25. The system of claim 23, wherein the instructions further configure the processor to:
in response to the second user input, display, in the search interface, more results matching the search query in the selected category than were initially displayed for the selected category.

26. The system of claim 23, wherein the instructions further configure the processor to:
determine whether a hierarchy of categories includes additional subcategories of the selected category.

27. The system of claim 23, wherein the subcategories are specific to the selected category.

28. The system of claim 23, wherein the subcategories are user-configurable.

29. The system of claim 23, wherein the instructions further configure the processor to:
receive a third user input, the third user input comprising a selection of one of the displayed results; and
in response to the third user input, open the selected result.

30. The system of claim 23, wherein the instructions further configure the processor to:
receive a fourth user input, the fourth user input comprising a removal of one of a selected category or subcategory; and
in response to the fourth user input, update the displayed results.

* * * * *